United States Patent [19]

Hammond et al.

[11] 4,307,159

[45] Dec. 22, 1981

[54] ZINC HALOGEN BATTERY ELECTROLYTE COMPOSITIONS WITH BISMUTH ADDITIVE

[75] Inventors: Michael J. Hammond, Sterling Heights; Patricia H. Schultz, Rochester, both of Mich.; Vladimir Feiman, St. Paul, Minn.

[73] Assignee: Energy Development Associates, Inc., Madison Heights, Mich.

[21] Appl. No.: 134,944

[22] Filed: Mar. 28, 1980

[51] Int. Cl.$^3$ ............................................. H01M 10/36
[52] U.S. Cl. ...................................... 429/105; 429/199
[58] Field of Search ............... 429/199, 101, 105, 206, 429/207; 204/55 R

[56] References Cited

U.S. PATENT DOCUMENTS

| | | | |
|---|---|---|---|
| 3,713,888 | 1/1973 | Symous | 429/199 X |
| 3,793,079 | 2/1974 | Brown et al. | 429/105 |
| 3,811,946 | 5/1974 | Creutz et al. | 429/199 X |
| 3,881,958 | 5/1975 | Carr et al. | 429/14 |
| 3,953,302 | 4/1976 | Rao et al. | 429/199 X |
| 3,993,502 | 11/1976 | Bjorkman, Jr. | 429/51 |
| 4,001,036 | 1/1977 | Berman et al. | 429/67 |
| 4,144,381 | 3/1979 | Fatica | 429/50 |
| 4,181,777 | 1/1980 | Spaziante et al. | 429/105 X |

*Primary Examiner*—Anthony Skapars
*Attorney, Agent, or Firm*—Harness, Dickey & Pierce

[57] ABSTRACT

This disclosure relates to a zinc halogen battery electrolyte composition containing an additive providing increased battery capacity. The improved electrolyte composition involves the use of a bismuth additive to inhibit undesirable irregular plating and reduce nodular or dendritic growth on the zinc electrode.

9 Claims, No Drawings

ZINC HALOGEN BATTERY ELECTROLYTE COMPOSITIONS WITH BISMUTH ADDITIVE

BACKGROUND OF THE INVENTION

In its broad aspects, the present invention is directed to secondary electrical energy storage systems of the aqueous type. A metal halogen hydrate electrical energy storage system of the type to which the present invention is applicable is fully described in U.S. Pat. No. 3,713,888, entitled "Halogen Hydrates", issued Jan. 30, 1973. This patent is owned by the same assignee as the present invention and details thereof beyond those herein described are incorporated in this application by reference. Metal halogen hydrate electrical energy storage systems or secondary storage batteries are conveniently categorized as being of the high energy density (H.E.D.) type because of their capacity to supply upwards of 50 watt hours of electric power per pound of weight. This high electrical energy capacity coupled with the compactness and low weight of such secondary storage batteries has rendered them particularly satisfactory for use as principal and auxiliary sources of electrical energy in either mobile (electric vehicles) or stationary (utility load leveling) power plant systems.

The present invention pertains primarily to zinc halogen battery systems, and more particularly to zinc chlorine battery systems, although it should be appreciated that the invention described herein may be equally applicable to other metal halogen battery systems. The chemical reactions which occur in a zinc chlorine hydrate battery are relatively straightforward. During charge, the electrolyte (a solution of zinc chloride in water) is flowed through the battery with the aid of a circulator. As electrical direct current is passed through the battery from an external source, zinc metal is electro-deposited on the negative electrode (typically relatively dense graphite) of the battery as a uniform, non-porous solid. Simultaneously, chlorine gas, generated at the positive electrode (typically porous graphite or ruthenia-catalyzed porous titanium) is carried away with the circulating electrolyte stream. Outside of the battery, the chlorine gas is admixed with cold water and a pale yellow solid called chlorine hydrate is formed. The solid chlorine hydrate ($Cl_2 \cdot xH_2O$) is retained separate from the battery. During discharge, the aqueous zinc chloride electrolyte is again circulated through the battery thereby carrying chlorine, which is slightly soluble in the electrolyte, to the chlorine electrode of the battery and permitting current to be withdrawn from the battery. To replace the chlorine in the electrolyte, the chlorine hydrate is heated in a controlled manner to release chlorine from the hydrate.

It has been found that a fundamental problem with zinc electrodes in either alkaline or acid solutions is that the zinc tends to form dendritic or nodular growths during the deposition process. Eventually, such dendritic growths lead to internal shorting of the battery, thereby limiting the charge capacity and decreasing the electrochemical energy efficiency of the battery. One solution which has been proposed to the problem of dendrite formation is the use of additives in the electrolyte solution; however, this additive approach has not met with total success. One may not be able to use the organic additives that have previously been used in the electrodeposition of metals, such as zinc, because the chlorine decomposes the organic additives. Further, the additives, through various mechanisms, may cause unwanted electrode polarizations. It has also been found that some additives tend to precipitate or salt out during repeated recharing; examples of such additives being benzotriazole, benzene sulfonamide, toluene sulfonamide, chlorotoluene sulfonamide and thiourea. Lastly, attempts at using certain organic additives, such as those described in U.S. Pat. No. 3,793,079 and U.S. Pat. No. 3,811,946 both owned by the assignee of the present invention, although effective, have not met with total success in all cases, since they sometimes tend to degrade over extended periods.

It has generally been found that the use of an inorganic additive such as thallium provides good leveling and battery capacity. However, the amount of thallium required to be effective is relatively large and may cause some unwanted voltaic polarizations. In addition, thallium is highly toxic. Therefore, it is still highly desirable to have some means of controlling the morphology of the zinc deposit, thereby increasing charge capacity of the battery.

SUMMARY OF THE INVENTION

The benefits and advantages of the present invention are achieved by employing a novel electrolyte composition in an electrical storage device or battery having an electrode area containing at least one positive and at least one negative electrode. In addition, a storage area may be provided for a halogen hydrate which is disposed in communication with the electrode area. The electrolyte composition comprises an aqueous solution containing a metal halide in which the metallic constituent comprises a metal such as zinc, and the halide constituent comprises a halogen such as chlorine or bromine, as well as mixtures thereof. The metal halide concentration may range from a concentration of about 0.1 percent up to a concentration approaching a saturation of the electrolyte. In addition, the electrolyte contains an additive, bismuth, which is soluble in the electrolyte and is present in an amount broadly ranging from about 50 to about 150 milligrams per liter of electrolyte, and preferably in an amount from about 70 to about 80 milligrams per liter of electrolyte, and more preferably at about 75 milligrams per liter of electrolyte. The bismuth is soluble in the electrolyte solution under the operating conditions encountered and does not adversely affect the structural components of which the battery is comprised. Bismuth may be added to the electrolyte solution as normal analytical reagent grade bismuth trichloride ($BiCl_3$). This electrolyte composition is believed to be particularly satisfactory for use in stationary power plant systems such as in utility load leveling.

Additional benefits and advantages of the present invention will become apparent upon a reading of the description of the preferred embodiments, taken in conjunction with the specific examples.

DESCRIPTION OF THE PREFERRED EMBODIMENTS

It will be understood that the concentrations of the several ingredients in the electrolyte as herein described and set forth in the subjoined claims are expressed in terms of molar concentrations, unless expressly indicated otherwise.

The electrolyte broadly comprises a solution containing one or more dissolved metal halides, bismuth, and dissolved and/or entrained halogen gas formed during the charging of the battery. In the more usual and preferred form, the electrolyte consists essentially of an aqueous zinc halide solution. In addition to the foregoing, other ingredients such as potassium chloride and/or sodium chloride can be included for providing further controlled variations and changes in the physical and chemical properties of the electrolyte, such as the electrical conductivity of the electrolyte, etc. The preferred halogen constituents are chlorine and bromine, of which the chloride salts of the preferred metals are particularly suitable and constitute the preferred embodiments. Particularly satisfactory results are obtained employing aqueous solutions containing zinc chloride as the metal halide in combination with effective dendrite reducing amounts of bismuth which may be added to the electrolyte solution as bismuth trichloride ($BiCl_3$). Generally, when zinc chloride is employed as the metal halide, concentrations ranging from about 5 percent to about 35 percent are preferred.

In order to further illustrate the invention, the following examples are provided. It is to be understood, however, that the examples are included for illustrative purposes and are not intended to be limiting of the scope of the invention as set forth in the subjoined claims.

EXAMPLES

Using a 50 wH (watthour) test cell containing about 260 $cm^2$ of electrode area, operated over various conditions, several tests were conducted to qualify the use of bismuth as an effective additive to the electrolyte. Electrolytes having bismuth concentration levels of about 0, 70, 75, 80, and 150 milligrams per liter of electrolyte were utilized during the tests to evaluate the effect of bismuth on zinc plate density and leveling during extended charge cycles. The zinc plates were removed from the graphite plates and examined.

With regard to the preparation of the electrolyte, a 50–60% (by weight) zinc chloride aqueous solution, prepared by the reaction of chlorine with high purity (99.9+%) zinc metal in an aqueous medium, was diluted with distilled water. A small quantity (or about 150 millimoles/liter) of concentrated analytical grade HCl was then added to adjust the solution pH to a range of about 0.1 to 0.2. Into a known volume of this solution the desired quantity of bismuth was added by way of bismuth trichloride ($BiCl_3$). Potassium chloride (KCl) and/or sodium chloride (NaCl) were also added to increase the electrolyte conductivity.

The following table summarizes representative tests conducted and the results obtained for various bismuth concentrations. The zinc concentration swing for a complete 6 to 7 hour charge cycle was about 2 to 2.5 moles/liter. The chlorine gas pressure was about one atmosphere.

During the tests, the test cell was cycled using an initial electrolyte volume of 700 ml through three complete cycles to complete discharge. Other operating conditions, parameters, relationships, or the like are believed to be well within the expertise of one skilled in this art.

From a review of the above table, a comparison of the charge capacities obtained with electrolytes containing bismuth to the charge capacities obtained in the absence of bismuth, shows that the charge capacity is significantly increased by the presence of bismuth. Although not explicitly shown in the table, levels of bismuth below about 50 mg/l of electrolyte are not as effective as those levels shown in the table. At levels above about 150 mg/l of electrolyte, the effectiveness of bismuth is reduced. It should thus be apparent that bismuth works best at a level of about 50 to 150 mg/l of electrolyte and preferably at a level of about 70 to 80 mg/l of electrolyte. Microscopic evaluation of zinc plates containing bismuth indicates that some slight grain refining occurs.

Bismuth appears particularly attractive from several points of view. The quantity needed to produce a rather dramatic improvement in zinc plate morphology is quite low, or about 75 milligrams per liter of electrolyte. The bismuth additive of the present invention can be satisfactorily employed in accordance with the foregoing definitions and is soluble in the electrolyte in the specific concentrations required over the temperature range normally encountered during that specific battery use. In addition to the foregoing characteristics, bismuth additive is substantially stable during battery operation to avoid a rapid depletion thereof to levels below that normally required to attain the benefits of the present invention, and preferably to avoid the necessity of frequently or continuously replenishing the additive during the battery charging operation. Also, the bismuth additive does not degrade as do many organic additives. From a practical standpoint, the stability of the bismuth additive of the present invention is such to enable the battery to undergo one complete charging cycle without requiring a replenishment of the additive compound. Conveniently, a concentrate of the additive compound can be added to the battery electrolyte as a routine practice immediately prior to the initiation of a charging operation.

In general, the advantages of inhibiting dendritic growth may be considered to be two-fold. First, the charge capacity of the battery may be significantly increased and secondly, the energy efficiency of the battery is usually improved. In both of the above instances, the economics of the battery may be dramatically improved due to lower material costs, less actual battery area required, etc. In addition, the improved

| Bismuth Concentration (mg/l) | Electrolyte Concentration ($ZnCl_2$) | Added Salt Concentration [KCl] and/or [NaCl] | Avg. Temp. °C. | Charge Current Density (mA/$cm^2$) | Charge Time, hours | Battery or Charge Capacity Density (mA-hours/$cm^2$) |
|---|---|---|---|---|---|---|
| 0 | 3M | 0.5M KCl | 40° C. | 35 | 5.7 | 200 |
|  | 3M | 0.5M KCl | 25° C. | 50 | 2.6 | 130 |
| 70 | 3M | 2M KCl + 1M NaCl | 30° C. | 30 | 7 | 210 |
| 75 | 3M | 0.5M KCl | 35° C. | 35 | 8 | 280 |
|  | 3M | 1M NaCl | 38° C. | 30 | 7 | 210 |
|  | 3M | 0.5M KCl | 40° C. | 50 | 4 | 200 |
| 80 | 2.5M | 2.5M KCl | 30° C. | 50 | 6 | 300 |
| 150 | 3M | 0.5M KCl | 25° C. | 35 | 7.6 | 266 |
|  | 3M | 2M KCl | 33° C. | 35 | 6 | 210 |
|  | 3M | 0.5M KCl | 35° C. | 50 | 3.4 | 170 | battery electrolyte composition and construction of the present invention provides an attractive and viable alternative energy source in view of the ever increasing problems of oil supplies, and the like.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An electrolyte composition for use in a metal halogen battery construction having at least one positive electrode and at least one negative electrode, said electrolyte composition comprising an aqueous metal halide solution and bismuth as an additive to said electrolyte in a quantity effective in reducing dendrite formation on said negative electrode.

2. An electrolyte composition for use in a zinc halogen battery construction having at least one positive electrode and at least one negative electrode, said electrolyte composition comprising an aqueous zinc halide solution and bismuth as an additive to said electrolyte in a quantity effective in reducing dendrite formation on said negative electrode.

3. An improved zinc halogen battery construction comprising at least one positive electrode and at least one negative electrode and the electrolyte composition of claim 2.

4. An electrolyte composition for use in a zinc chlorine battery construction having at least one positive electrode and at least one negative electrode, said electrolyte composition comprising an aqueous zinc chloride solution and bismuth as an additive to said electrolyte in an amount from about 50 to about 150 milligrams per liter of electrolyte.

5. The invention of claim 4 wherein said bismuth is present in said electrolyte in an amount from about 70 to about 80 milligrams per liter of electrolyte.

6. The invention of claim 4 wherein said bismuth is present in said electrolyte in an amount of about 75 milligrams per liter of electrolyte.

7. An improved zinc chlorine battery construction comprising at least one positive electrode and at least one negative electrode and the electrolyte composition of claim 4.

8. An electrolyte composition for use in a zinc chlorine battery construction having at least one positive electrode and at lease one negative electrode, said electrolyte composition comprising an aqueous zinc chloride solution and bismuth as an additive to said eleectrolyte in a quantity effective to increase the charge capacity density of said battery.

9. The invention of claim 8 wherein said bismuth is present in said electrolyte in an amount from about 50 to about 150 milligrams per liter of electrolyte.

* * * * *

UNITED STATES PATENT AND TRADEMARK OFFICE
CERTIFICATE OF CORRECTION

PATENT NO. : 4,307,159

DATED : December 22, 1981

INVENTOR(S) : Hammond, Michael J., Schultz, Patricia H., and Feiman, Vladimir

It is certified that error appears in the above—identified patent and that said Letters Patent is hereby corrected as shown below:

Title of Patent, fifth word of title "Compositions" should be
--Composition--.

Column 2, line 3, "recharing" should be --recharging--.

Column 6, lines 24 & 25, "eleectrolyte" should be
--electrolyte--.

Signed and Sealed this

Fourth Day of May 1982

[SEAL]

Attest:

GERALD J. MOSSINGHOFF

Attesting Officer      Commissioner of Patents and Trademarks